United States Patent
Xue et al.

(10) Patent No.: US 8,060,309 B2
(45) Date of Patent: Nov. 15, 2011

(54) CHARACTERIZATION OF FRACTURE LENGTH AND FORMATION RESISTIVITY FROM ARRAY INDUCTION DATA

(75) Inventors: Cynthia Xue, Houston, TX (US);
Michael B. Rabinovich, Houston, TX (US); Alexandre N. Bespalov, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 412 days.

(21) Appl. No.: 12/359,822

(22) Filed: Jan. 26, 2009

(65) Prior Publication Data
US 2009/0192714 A1 Jul. 30, 2009

Related U.S. Application Data

(60) Provisional application No. 61/024,283, filed on Jan. 29, 2008.

(51) Int. Cl.
*G06F 19/00* (2011.01)
(52) U.S. Cl. .......................................................... 702/7
(58) Field of Classification Search .......... 702/7, 10–13, 702/182–185, 188
See application file for complete search history.

(56) References Cited

U.S. PATENT DOCUMENTS

| | | | |
|---|---|---|---|
| 5,233,522 A | 8/1993 | Sinclair | |
| 5,656,930 A | 8/1997 | Hagiwara | |
| 6,502,036 B2 | 12/2002 | Zhang et al. | |
| 6,643,589 B2 | 11/2003 | Zhang et al. | |
| 6,760,666 B2 | 7/2004 | Hagiwara | |
| 6,925,031 B2 | 8/2005 | Kriegshauser et al. | |
| 6,925,384 B2 | 8/2005 | Frenkel et al. | |
| 6,937,021 B2 | 8/2005 | Rosthal | |
| 7,359,800 B2 * | 4/2008 | Rabinovich et al. | 702/7 |
| 2004/0090234 A1 | 5/2004 | Macune | |
| 2005/0256645 A1 | 11/2005 | Rabinovich et al. | |
| 2007/0234787 A1 | 10/2007 | Rabinovich et al. | |

FOREIGN PATENT DOCUMENTS
WO WO9535514 12/1995

OTHER PUBLICATIONS

M. Rabinovich et al.; "Effect of Fractures on Multi-Component and Multi-Array Induction Logs," SPWLA 45th Annual Logging Symposium, Jun. 6-9, 2004, Paper UU, pp. 1-16.
Y. Tang et al.; "Interpreting fracture length from multi-array induction logs," SEG/New Orleans 2006 Annual Meeting, pp. 421-425.

* cited by examiner

*Primary Examiner* — Edward Raymond
(74) *Attorney, Agent, or Firm* — Mossman, Kumar & Tyler, P.C.

(57) ABSTRACT

Measurements made by a multi-array/multi-frequency induction resistivity logging tool in a borehole are used for determining the length of fractures in an earth formation and the resistivity of the unfractured formation when the fractures have a resistive fluid. A look-up table based on modeling of a fracture by a pair of wings is used.

18 Claims, 3 Drawing Sheets

CHARACTERIZATION OF FRACTURE LENGTH AND FORMATION RESISTIVITY FROM ARRAY INDUCTION DATA

CROSS-REFERENCES TO RELATED APPLICATIONS

This application claims priority from U.S. Provisional Patent Application Ser. No. 61/024,283 filed on 29 Jan. 2008.

BACKGROUND OF THE DISCLOSURE

1. Field of the Disclosure

The disclosure is related generally to the use of resistivity measurements for identification of fracturing and determination of the extent of fracturing in earth formations and establishing true formation resistivity without fracturing.

2. Background of the Art

In exploration for hydrocarbons, a significant number of reservoirs involve fractured reservoirs. Broadly speaking, there are two types of situations encountered in development of such reservoirs. The first case involves a rock matrix that has a significant porosity so that the hydrocarbons occur within the pore spaces of the rock matrix; however, the permeability of the matrix itself is very low, making development of such reservoirs uneconomical. In such rocks, permeability resulting from fracturing of the rock matrix may make commercial development economical. A second case involves reservoirs in which the only significant porosity in the reservoir is due to fracturing of the rock matrix. Examples of reservoirs that produce from fractured granite are the Playa Del Rey field and the Wilmington field in California, and the Hugoton field in Kansas. It is thus important to be able to identify the extent of fracturing in earth formations.

Fractures observed in boreholes hold important clues for the development of a field. Open natural fractures may enhance productivity in the case of depletion drive or lead to early water breakthrough under a water drive or strong aquifer scenario. However, cemented fractures may form barriers to flow. Therefore it is important to know the length of natural fractures to allow for optimized field development. Drilling induced fractures can also be observed in a wellbore. This information can be used to determine the direction in which hydraulic fractures employed in the development of tight reservoirs will propagate. The actual hydraulic fractures can be monitored with micro-seismic, which is relatively expensive and requires a monitoring well close by.

Drilling induced fractures are frequently generated by heavy mud and/or drilling force. Characterization of borehole fractures is important since they reflect the formation stresses. The appearance of fractures filled with conductive or resistive fluid changes the original formation resistivity distribution around the wellbore. This resistivity change affects the multiple depths of investigation measurements of the induction tools differently depending on fractures conductivity, inclination, orientation, width, length, and density. To accurately characterize undisturbed formation resistivity, corrections for the fracture presence is required.

There have been numerous attempts at characterizing fractures and determining formation resistivity. U.S. Pat. No. 5,574,218 to Withers discloses the use of seismic methods to determine the azimuth and length of a hydraulic fracture. No determination of formation resistivity is done. There are many references directed at determining horizontal and vertical resistivities of anisotropic formations. See, for example, U.S. Pat. No. 6,502,036 to Zhang et al., having the same assignee as the present disclosure, and U.S. Pat. No. 6,643,589 to Zhang et al., having the same assignee as the present disclosure,. U.S. Pat. No. 6,925,031 to Kriegshauser et al., having the same assignee as the present disclosure, uses acoustic and multicomponent 3DEX® to determine fracture properties. However, the prior art does not address the problem of simultaneously determining fracture properties and resistivities of the formation.

The present disclosure deals with the need for determination of fracture properties and true formation resistivities using induction data.

SUMMARY OF THE DISCLOSURE

The present disclosure is a method of evaluating an earth formation wherein the earth formation has a fluid filled fracture. Measurements are made with different depths of investigation by an induction logging tool conveyed in a borehole in the earth formation. The induction logging tool may have a plurality of axially oriented transmitter-receiver combinations or it may be a multicomponent logging tool. The different depths of investigation may be obtained by multi-frequency measurements and/or by measurements made with different transmitter-receiver spacings. The measurements made by the induction logging tool are processed to determine a length of the fracture, and the resistivity of the unfractured formation.

Another embodiment of the disclosure is an apparatus for evaluating an earth formation. The apparatus includes an induction logging tool configured to be conveyed in a borehole in the earth formation. The induction logging tool may have a plurality of axially oriented transmitter-receiver combinations or it may be a multicomponent logging tool. A processor is configured to determine from measurements made by the induction logging tool with different depths of investigation a length of the fracture and a resistivity of the unfractured formation. The different depths of investigation may be obtained by using multi-frequency measurements and/or multiple transmitter-receiver spacings.

Another embodiment of the disclosure is a computer-readable medium accessible to at least one processor. The computer-readable medium includes instructions which enable the at least one processor to estimate a radial extent of a fracture in an earth formation and a value of a resistivity property of the earth formation using measurements having a plurality of depths of investigation made by an induction logging tool conveyed in a borehole; and use the estimated radial extent of the fracture for subsequent development of a reservoir in the earth formation.

BRIEF DESCRIPTION OF THE FIGURES

The present disclosure is best understood with reference to the following figures in which like numbers refer to like components and in which.

DETAILED DESCRIPTION OF THE DISCLOSURE

Figure 1:
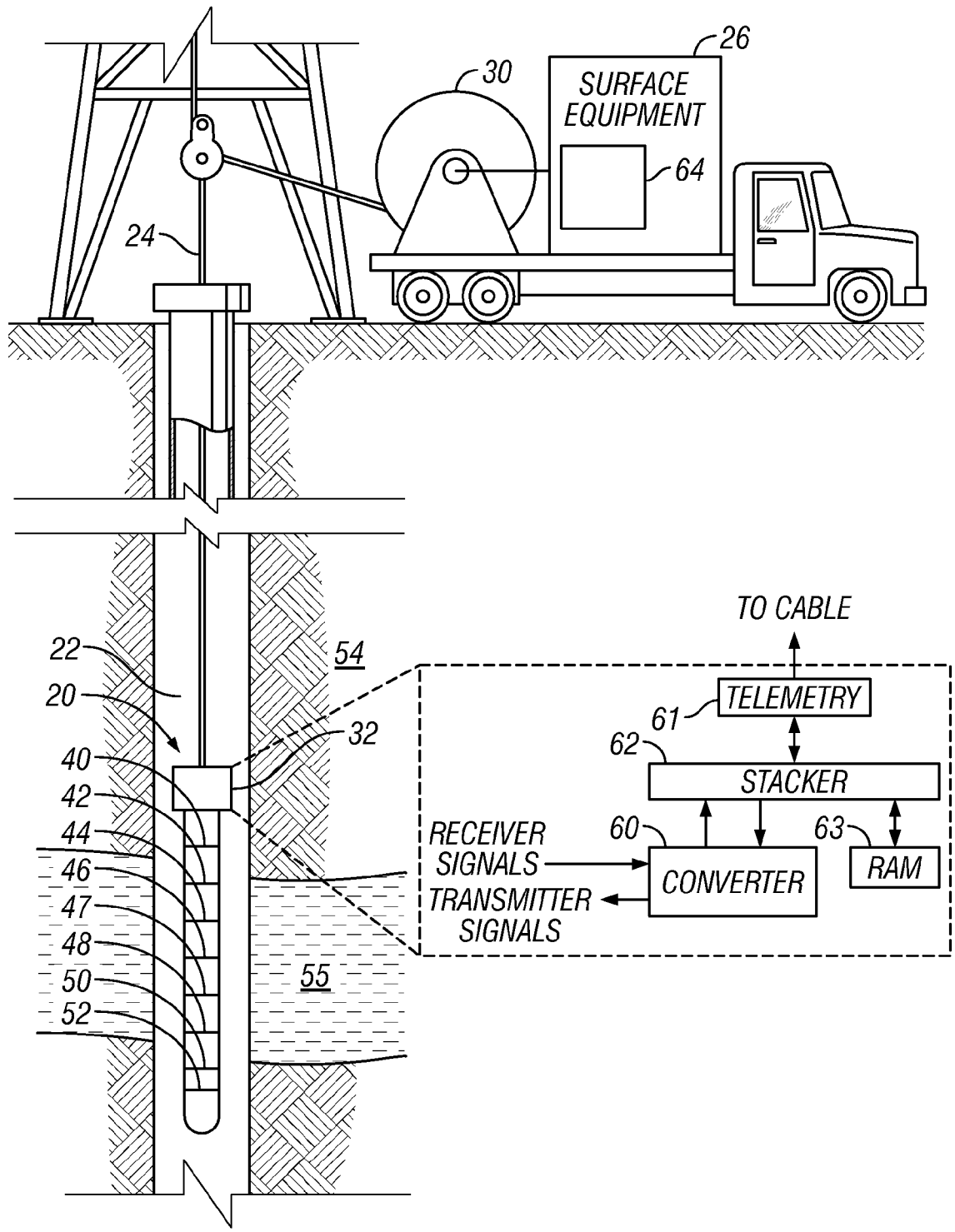
FIG. 1 (prior art) illustrates an induction instrument disposed in a wellbore penetrating earth formations.

Referring now to FIG. 1, an exemplary induction logging tool 20 suitable for use with the method of the present disclosure is shown positioned in a borehole 22 penetrating earth formations 54. It should be noted that the description relates to a wireline-conveyed logging tool. This is not to be construed as a limitation and the method of the disclosure may also be practiced using measurements made with a logging tool conveyed on a bottomhole assembly by a drilling tubular. The tool 20, which is suspended in the borehole 22 by means of a wireline cable 24, includes a borehole sonde 34 and an electronic circuitry section 32. The tool 20 is lowered into the borehole 22 by a cable 24, which may pass over a sheave 30 located at the surface of the borehole 22. The cable 24 is typically spooled onto a drum (not shown). The cable 24 includes insulated electric conductors for transmitting electrical signals. The electronic circuitry section 32 of the tool 20 receives signals from the sonde section 34 and typically comprises a processor. Some or all of the processing may also be done by a surface processor, or by a remote processor linked to the wellsite by a suitable satellite link.

The sonde 34 may include a plurality of coils 40-52. Coil 46 is a transmitter coil for transmitting an oscillating signal into the adjacent surrounding geological formation 54. A square wave signal may be supplied to the coil 46. However, it is contemplated that any of a number of oscillating voltage signals having multiple frequency components can be used. Further, it is desirable that, on occasion, a single-frequency signal, such as a sinusoidal signal, is used. The oscillating voltage signal applied to the coil 46 generates a current in coil 46 which in turn generates an electromagnetic field in the surrounding formation 54. The electromagnetic field, in turn, induces eddy currents which flow coaxially with respect to the borehole 22. The magnitudes of the eddy currents are proportional to the conductivity of the surrounding formation 54. The remaining coils 40, 42, 44, 47, 48, 50 and 52 are receiver coils in which signals are induced by the electric fields caused by the eddy currents produced in the formation. As the tool 20 is raised in the borehole 22, the conductivity of the surrounding formation 54 can be determined from the received signals in order that a bed or layer 55 having a conductivity indicative of the possibility of containing hydrocarbons may be located. The configuration shown is called a High Definition Induction Logger (HDIL) and is for exemplary purposes only. Other coil configurations exist, specifically those in which transmitter and receiver coils are transverse to the tool axis. Such a configuration is used by Baker Hughes under the service mark 3DEX®, and the method of the present disclosure is also applicable with 3DEX® multi-frequency type measurements or/and LWD MPR propagation type measurements.

The electronic circuitry section 32 typically includes a converter circuit 60, a stacker circuit 62, a random access memory (RAM) 63, and a telemetry circuit 61. The converter circuit 60 comprises a plurality of pre-amplifiers, filters, and analog-to-digital (A/D) converters for receiving signals from the receiver coils 40-52 and transforming them into digitized signals for further processing by the stacker circuit 62. The analog voltage signals provided by the receiver coils 40-52 are digitally sampled according to a predetermined sampling rate in the period defined by the fundamental frequency of the transmitter signal, which in this embodiment is approximately 10 kHz.

The sampling is repeated over a large number of transmitter voltage signal cycles, such as at least 1,024 cycles to improve the signal-to-noise ratio of the received signals. To reduce the amount of data that must be stored or transmitted, corresponding digital samples taken in each of the transmitter cycles are summed. The summed digital signal samples corresponding to each of the plurality of receiver coils form corresponding stacked signal samples, which are stored in the RAM 63. The stacked signals corresponding to the plurality of receiver coils 40-52 can then be retrieved from the RAM 63 and can be transmitted by the telemetry circuit 61 through the cable 24 to a computer (processor) 64 which forms part of the surface equipment 26, where analyses of the stacked signals can be performed.

In an alternative embodiment, a microprocessor having sufficient digital signal processing capabilities could form part of the electronic circuitry section 32. Thus, it is contemplated that the data analysis could be performed downhole, which would further reduce the amount of data to be transmitted to the surface.

In this disclosure, the array induction tool (HDIL) is used to acquire multi-spacing and multi-frequency induction data that are sensitive to the radial resistivity distribution. What is important is to obtain measurements with different depths of investigation. In a departure from past induction tools which rely on hardware focusing to provide two induction measurements at two depths of investigation, the HDIL utilizes the raw data from seven receivers to derive software focusing logs with matched vertical resolution and different depth of investigation. The increase in data permits, for the first time, more detailed investigations in the radial direction, which can be of value for complicated invasion profiles. The tool acquires data at multiple frequencies from approximately 10 kHz to 150 kHz. After being corrected for borehole and skin effects, the data from all subarrays are processed to generate six vertical resolution matched curves, each having a different depth of investigation from 10 to 120 in. (0.254 m to 3.048 m). As noted above, other coil configurations may be used.

The finite-element 3D code for simulation of induction tool responses in a fractured medium is called FEMCYL3D (developed by Baker Atlas). It is a 3-D code for the numerical solution of the Maxwell equations. The model is discretized with the finite-element method on a cylindrical grid with the z-axis coinciding with the tool axis. The Nédélec edge basic functions of the lowest order are employed. The resulting algebraic system is solved by the preconditioned full GMRES ("generalized minimum residual") iterative method.

Figure 2:
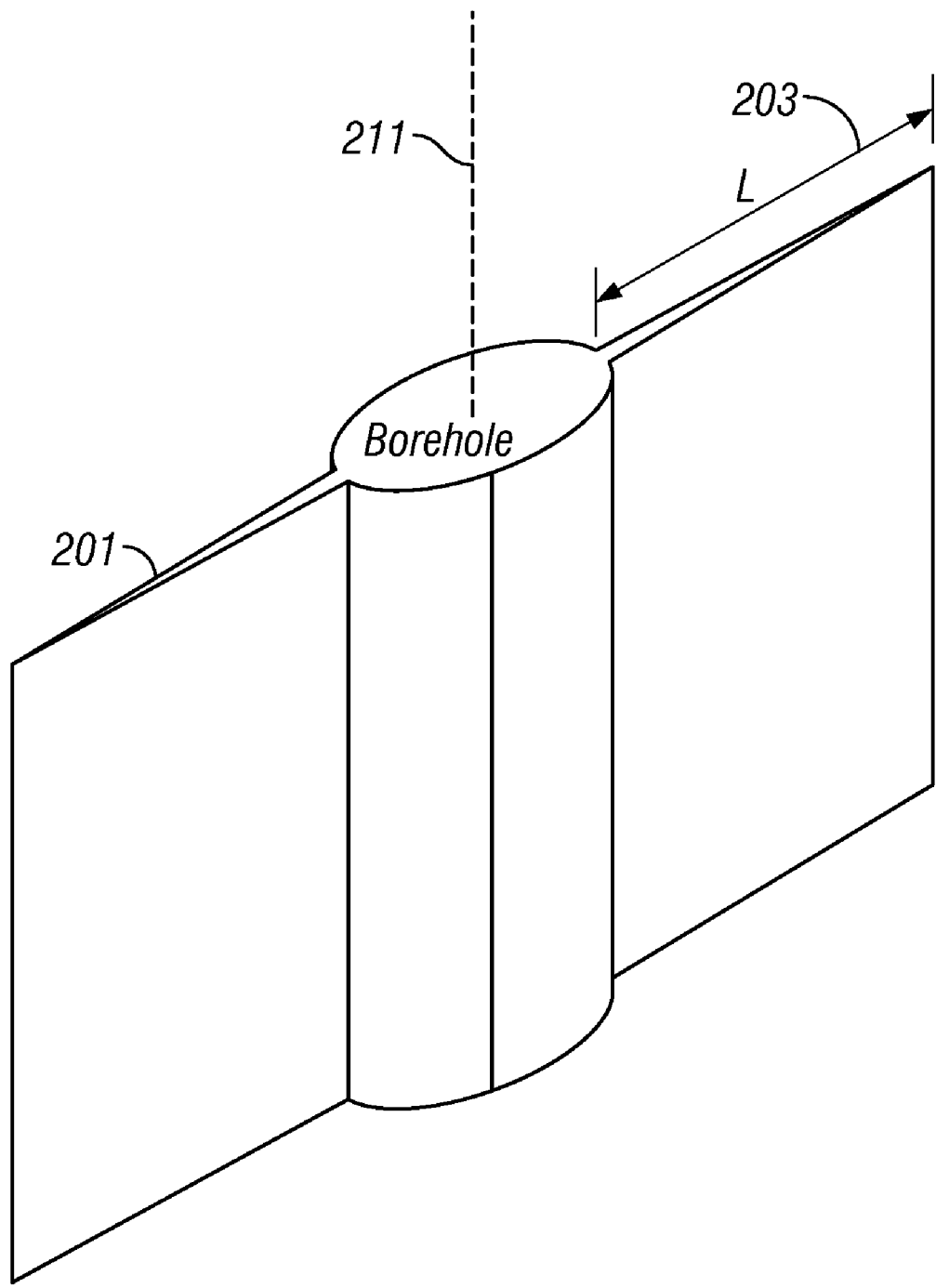
FIG. 2 illustrates the geometry of the model used in the Finite Element Modeling.

We model a hydraulic fracture with a wing-like fracture model, see FIG. 2. The fracture length "L" is assumed to be long enough in the vertical direction that edge effects can be neglected. The two wings 201, 203 are symmetrical with respect to the borehole axis 211. The fracture is assumed to have the same resistivity that the mud has. As stated above, a fracture filled with conductive mud is practically invisible to conventional axial-coil induction logs. Hence, throughout this disclosure, we assume the fracture is filled with nonconductive mud.

A preconditioning operator is used in FEMCYL3D that corresponds to the same medium but without fractures. The discretization grid has 42*256*59 steps in the radial, azimuthal and axial (r-, φ-, and z-) directions, respectively. The number of iterations needed to reach a prescribed precision depends on the model resistivity contrast and the fracture length. The required CPU time on a SUN workstation for a single calculation (one frequency) can vary from several minutes to couple of hours. The minimal grid step (around the sensors) was about 1 cm, and grid cells up to 500 inches in size were used near the outer (artificial) boundary of the computational domain. Any vertical fracture was modeled as two azimuthal sectors of the grid (opposite to each other) filled with a mud. It should be noted that other modeling programs could be used to do the simulation.

We generated look-up tables with the tool responses for the oil based mud since array induction logs are mostly affected in this situation. The borehole size of the vertical well is set to be 12.25 in. The formation resistivity of the models varies from 0.2 Ω-m to 100 Ω-m, while the fracture length is considered from 0 to 300 feet (0 to 91.44 m). The 300 feet fracture could be regarded as an infinite fracture which may represent natural fractures. In all cases we assume that the fractures are filled with borehole mud and have the resistivity of the borehole fluid. The look-up table for different model parameters is large enough to cover sufficient ranges of formation resistivity and fracture length. Linear interpolation is used to calculate responses of fracture models that are not covered by the table.

The present method for determining fracture length and true formation resistivity from array induction logs is based on an inversion method. By forward modeling, we generate synthetic induction responses of a fracture model and compare it with the response of measured raw data. The fracture model is adjusted until the synthetic response best matches the measured one. This approach requires the 3D modeling method described in the last section to generate a look-up table of synthetic responses.

The azimuth and length are two of the most important parameters of a hydraulic fracture. In general, hydraulic fractures tend to propagate horizontally along the maximum horizontal stress direction. Also, the array data obtained with co-axial coils are insufficient to determine fracture azimuth due to azimuthal symmetry of the measurements. The azimuth of a fracture is often recognized from a borehole image logs. These can be obtained by either a resistivity imaging device or by an acoustic imaging device. Multi-component induction tools may also used to determine fracture azimuth. In the present disclosure, we determine the length of a fracture together with non-fractured formation resistivity from the synthetic model that best fits the synthetic data. We consider a single symmetric fracture which allows us to reduce the number of parameters of the geological model without compromising its accuracy.

In the iteration process, a $\chi^2$ error is used to define the accuracy of the data misfit.

$$\chi^2 = \frac{\sum_{j=1}^{m}\sum_{i=1}^{n}\left(\sqrt{\frac{(\sigma_{ij}^a - \sigma_{ij}^s)^2}{noise^2}} \cdot W_{ij}\right)}{n \cdot m}. \quad (1)$$

Here n is the number of arrays and m is the number of frequencies. In the case of the HDIL tool, n=7 and m=8. The symbol $\sigma^a$ represents array measurement, while $\sigma^s$ is the corresponding synthetic apparent conductivity. The noise is determined by the accuracy of the HDIL tool in the unit of mS/m. The apparent conductivity can be negative, so we defined the noise as, $$noise = 2\%|\sigma_i^s| + \Delta \quad (2),$$

where $\Delta$ represents absolute error for each array. The effect of a fracture on apparent formation resistivity is different for different frequencies and different transmitter-receiver distance. See, for example, U.S. patent application Ser. No. 11/125,530 of Rabinovich et al., having the same assignee as the present disclosure. Therefore, by using a different weight $W_{ij}$ in Eqn. (1) on the corresponding array logs, it is possible to fine tune the algorithm to accurately predict the fracture length and distinguish a deeper fracture from a shallower one.

The $\chi^2$ errors for the data misfit at various levels could also be used to demonstrate the quality of prediction for fracture length and formation resistivity. To minimize the non-uniqueness, the optimal parameters of formation resistivity $R_k$ (from 0.2 Ω-m to 100 Ω-m) and fracture length $F_l$ (from 0 feet to 300 feet) are estimated through the detection of the minimum value for $E_{kl}$, $$E_{kl} = \chi_{kl}^2 + R_k \delta_l \quad (3),$$

where $\delta_l$ is the weight that is related to the $\chi^2$ error for certain $F_l$. Here we take $\delta_l$ as the minimum value of $\chi^2$ error for different fracture length $F_l$ at the same formation resistivity.

In order to illustrate the efficiency of the method discussed above, we show results of using the method on a data set from a commercial well with large fracture effects. The well has deep fracture of as much as of 23 feet in the shale zone. In this case, the accuracy of the algorithm is demonstrated by comparing the "yet unfractured" LWD resistivity measurements with the formation resistivity estimate by the method discussed above.

Figure 3:
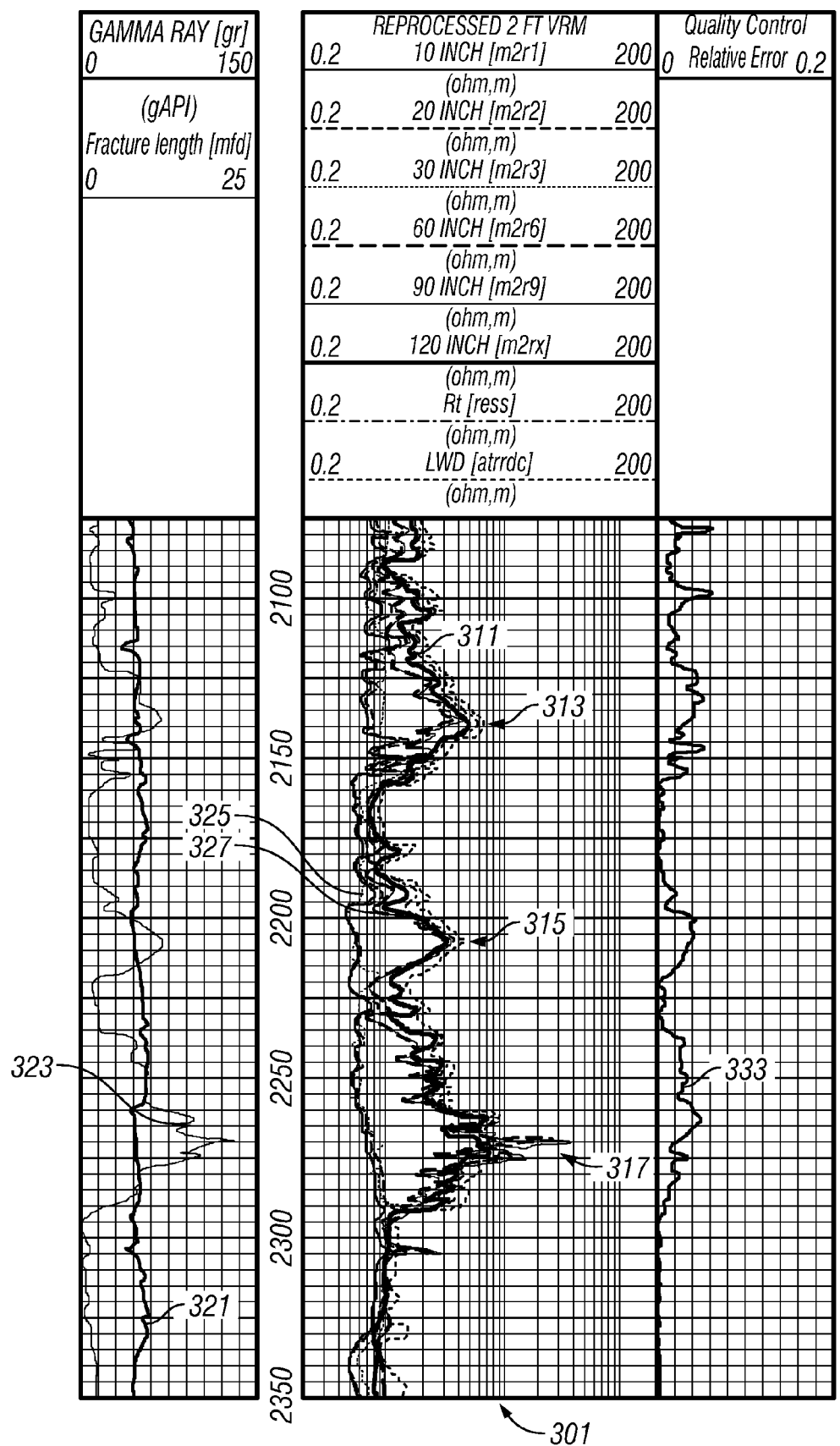
FIG. 3 shows the results of using the method of the present disclosure on an exemplary well.

The vertical well was drilled using an oil-based mud system with a 12.25-in bit size. The caliper curve (not shown) indicates relatively good condition of the borehole wall with a few intervals of rugosity. The middle track 301 of FIG. 3 depicts the tool measurements, which has been focused to the same vertical resolution of 2 feet. The six curves, collectively labeled as 311, and processed to the same vertical resolution of 2 ft show depths of investigation from 10 in to 120 in.

The gamma ray curve 321 in the left track of FIG. 3 indicates the entire interval is a shale zone. However the HDIL tool measurements 311 show high resistivity in some intervals. See the zones indicated by 313, 315, 317. This is caused by fracturing, which is quite discernable in this reservoir. For example, the measured deep resistivity reaches over 40 Ω-m at depth 2568 ft in the low resistive shale zone. The evaluated fracture length, which is represented as the curve 323 in the left track, varies from shallow fracturing of 1.5 feet to deep fracturing of 23 feet.

With prior art methods, it would be difficult to predict the true formation resistivity of the reservoir which has such deep fracturing in the shale zone. FIG. 3 also shows LWD resistivity measurements 325 and the estimated resistivity of the unfractured formation 327. The excellent agreement between the LWD resistivity and the formation resistivity estimated from HDIL measurements confirms the high accuracy and reliability of the present method.

Due to the fact that the approach is implemented based on synthetic data simulated for thick layers, there are some shoulder bed artifacts for the results. For example, the spikes near the boundaries of the layers at depth 2150 ft and 2220 ft. These may be suppressed using larger vertical resolution. There are clear correlations between the variation patterns of the tool response and the predicted fracture length. The correlations indicate the fracture effects on the HDIL measurements. The high quality of data fit is also demonstrated as the $\chi^2$ error curve in the right track. It shows that the $\chi^2$ error between measurement and synthetic data is below 6% in the fractured zones.

One contribution of the technique is that it eliminates fracture effects from the multi-array induction measurements and delivers fracture length as well as a virgin zone resistivity. It enhances the ability of multi-array induction tools for more precise interpretation of the log data in fractured reservoirs. Once a fracture has been identified as being deep, its orientation may be ascertained, for example, from multi-component induction or image logs. Subsequent reservoir development may be done with deviated wells having a trajectory that is substantially orthogonal to the fracture plane. The evaluated true formation resistivity helps to differentiate productive sand zones from non-productive fractured shale zones, which prior art induction method could not. The information of predicted fracture length allows for an optimized field development. The approach is fast and reliable and easily applicable as a real time processing.

The disclosure above has been made with respect to a logging tool that is part of logging string conveyed on a wireline. The method may also be practiced using an induction logging tool that is part of a bottomhole assembly conveyed on a drilling tubular. Some or all of the processing may be done by a downhole processor, a processor at the surface, or a processor at a remote location. Implicit in the control and processing of the data is the use of a computer program on a suitable machine readable medium that enables the processor to perform the control and processing. The machine readable medium may include ROMs, EPROMs, EEPROMs, Flash Memories and Optical disks. The disclosure may also be implemented in conjunction with a measurement-while-drilling arrangement in which the multicomponent and multiarray measurements are made using a suitable device on a bottomhole assembly conveyed on a drilling tubular such as a drillstring.

What is claimed is:

1. A method of evaluating an earth formation, the method comprising:
   using an induction logging tool conveyed in a borehole for making high definition induction log measurements indicative of a resistivity property of the formation at a plurality of depths of investigation;
   using the high definition induction log measurements having the plurality of depths of investigation only for estimating a radial extent of a fracture in the earth formation and a value of the resistivity property of the earth formation; and
   using the estimated radial extent of the fracture for subsequent development of a reservoir in the earth formation.

2. The method of claim 1 wherein the earth formation further comprises an anisotropic formation and wherein estimating the value of the resistivity property further comprises estimating a value of: (i) a horizontal resistivity, and (ii) a vertical resistivity.

3. The method of claim 1 wherein the fracture includes a substantially nonconductive fluid.

4. The method of claim 1 wherein using the induction logging tool further comprises using a tool having a transmitter antenna and a receiver antenna having axes substantially parallel to a longitudinal axis of the logging tool.

5. The method of claim 1 wherein making the high definition induction log measurements having a plurality of depths of investigation further comprises at least one of: (i) operating the induction logging tool at a plurality of frequencies, and (ii) using an induction logging tool with a plurality of transmitter-receiver spacings.

6. The method of claim 1 further comprising estimating an orientation of the fracture using at least one of: (i) an induction logging tool having a transverse antenna, and (ii) a borehole imaging tool.

7. The method of claim 1 wherein estimating the radial extent of the fracture and the value of the resistivity further comprises using a look-up table.

8. The method of claim 7 wherein the look-up table is generated using a model in which the fracture is modeled by a pair of wings extending away from the borehole.

9. The method of claim 1 further comprising filtering the high definition induction log measurements at each of the plurality of depths of investigation to have substantially the same vertical resolution prior to estimating the radial extent of the fracture and the value of the resistivity property.

10. An apparatus configured to evaluate an earth formation, the apparatus comprising:
    an induction logging tool configured to be conveyed in a borehole and make high definition induction log measurements indicative of a resistivity property of the formation at a plurality of depths of investigation; and
    at least one processor configured to:
        (i) use the high definition induction log measurements having the plurality of depths of investigation only to estimate a radial extent of a fracture in the earth formation and a value of the resistivity property of the earth formation; and
        (ii) use the estimated radial extent of the fracture for subsequent development of a reservoir in the earth formation.

11. The apparatus of claim 10 wherein the earth formation further comprises an anisotropic formation and wherein the resistivity property the value of which the at least one processor is configured to estimate further comprises at least one of:
    (i) a horizontal resistivity, and (ii) a vertical resistivity.

12. The apparatus of claim 10 wherein the fracture whose extent the at least one processor is configured to estimate includes a substantially nonconductive fluid.

13. The apparatus of claim 10 wherein using the induction logging tool further comprises a transmitter antenna and a receiver antenna having axes substantially parallel to a longitudinal axis of the logging tool.

14. The apparatus of claim 10 wherein the induction logging tool further comprises at least one of: (i) an induction logging tool configured to operate at a plurality of frequencies, and (ii) an induction logging tool with a plurality of transmitter-receiver spacings.

15. The apparatus of claim 10 wherein the at least one processor is further configured to estimate an orientation of the fracture using an output of at least one of:
    (i) an induction logging tool having a transverse antenna, and (ii) a borehole imaging tool.

16. The apparatus of claim 10 wherein the induction logging tool is one of: (i) part of a logging string conveyed on a wireline, and (ii) part of a bottomhole assembly conveyed on a drilling tubular.

17. A computer-readable medium accessible to at least one processor, the computer-readable medium including instructions which enable the at least one processor to:
    estimate a radial extent of a fracture in an earth formation and a value of a resistivity property of the earth formation using only high definition induction log measurements having a plurality of depths of investigation made by an induction logging tool conveyed in a borehole; and
    use the estimated radial extent of the fracture for subsequent development of a reservoir in the earth formation.

18. The computer-readable medium of claim 17 further comprising at least one of: (i) a ROM, (ii) an EPROM, (iii) an EEPROM, (iv) a flash memory, and (v) an optical disk.

* * * * *